United States Patent [19]
Landin

[11] Patent Number: 5,474,840
[45] Date of Patent: Dec. 12, 1995

[54] SILICA-CONTAINING VIBRATION DAMPER AND METHOD

[75] Inventor: Donald T. Landin, Eagan, Minn.

[73] Assignee: Minnesota Mining and Manufacturing Company, St. Paul, Minn.

[21] Appl. No.: 282,793

[22] Filed: Jul. 29, 1994

[51] Int. Cl.$^6$ ...................................................... B32B 9/00
[52] U.S. Cl. ...................... 428/294; 428/295; 428/411.1; 428/420; 52/167.1
[58] Field of Search ................................ 428/411.1, 295, 428/294, 420; 52/167 R

[56] References Cited

U.S. PATENT DOCUMENTS

| | | | |
|---|---|---|---|
| 4,710,536 | 12/1987 | Klingen et al. | 524/493 |
| 4,749,590 | 6/1988 | Klingen et al. | 427/54.1 |
| 5,024,880 | 6/1991 | Veasley et al. | 428/317.5 |
| 5,161,338 | 11/1992 | Tada | 428/192 |
| 5,256,223 | 10/1993 | Alberts et al. | 428/343 |
| 5,335,463 | 8/1994 | Reinhall | 52/167 R |

*Primary Examiner*—Patrick J. Ryan
*Assistant Examiner*—Kam F. Lee
*Attorney, Agent, or Firm*—Gary L. Griswold; Walter N. Kirn; Steven E. Skolnick

[57] ABSTRACT

A method for vibrationally damping an article that is subject to resonant vibrations comprises the steps of providing a vibration damper and applying the vibration damper to the article to damp the resonant vibrations. The vibration damper comprises an acrylate viscoelastic vibration damping material and an effective amount of hydrophobic silica. The invention also relates to vibration dampers that utilize the acrylate viscoelastic vibration damping material as well as articles that incorporate the vibration dampers.

13 Claims, 3 Drawing Sheets

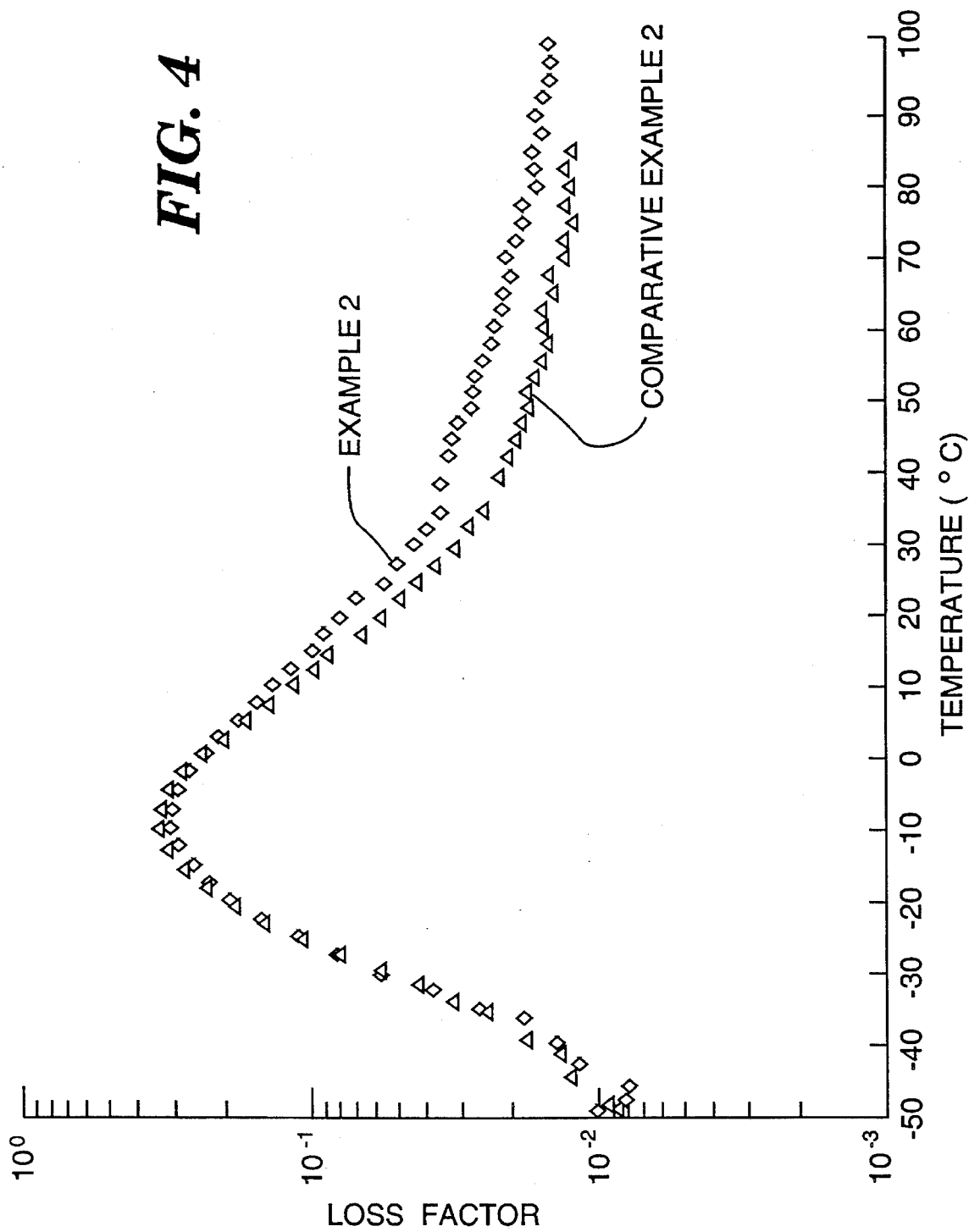

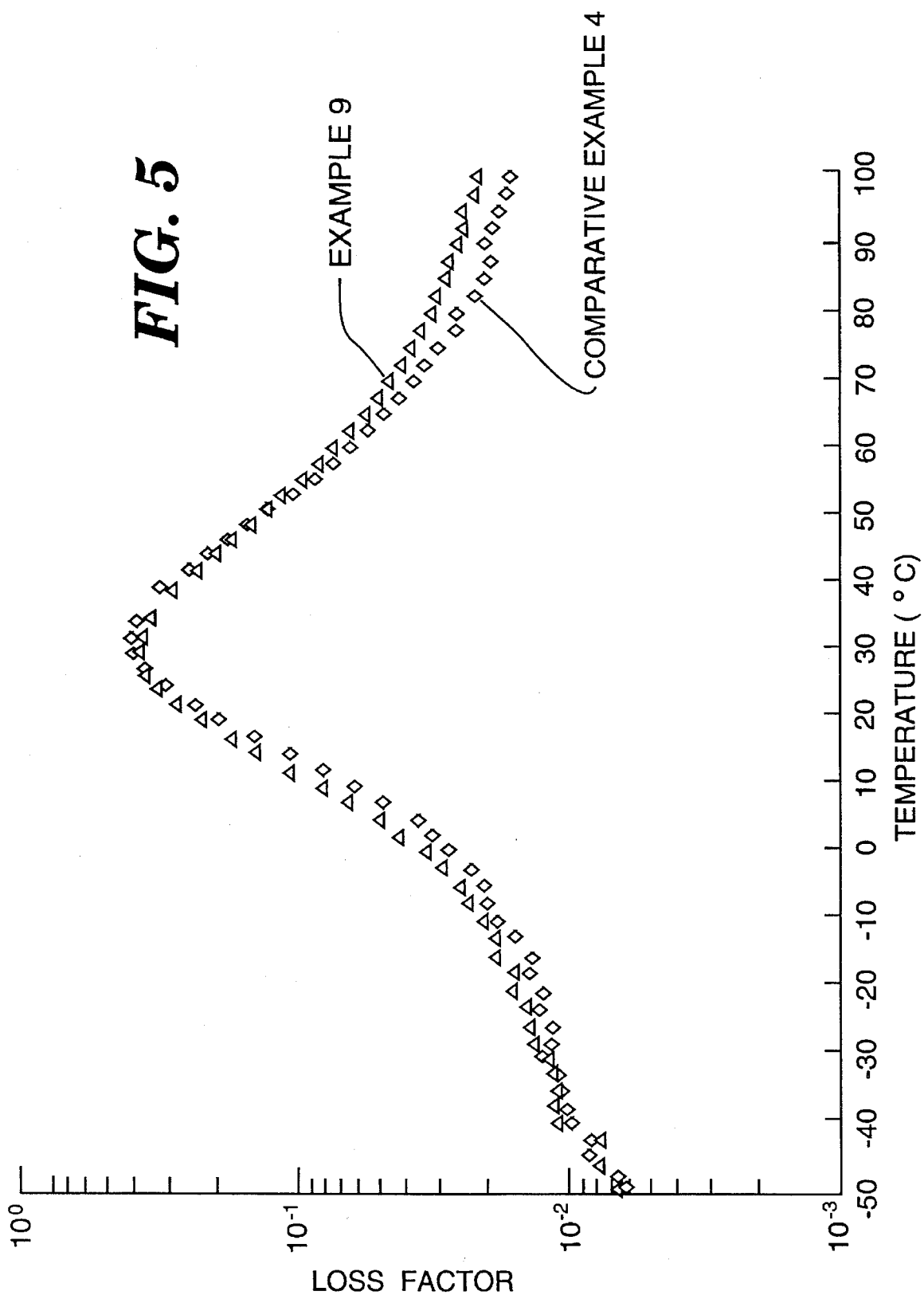

SILICA-CONTAINING VIBRATION DAMPER AND METHOD

BACKGROUND OF THE INVENTION

1. Field of the Invention

In general, this invention relates to vibration dampers. More specifically, this invention relates to vibration dampers that include a silica-containing, viscoelastic vibration damping material. The invention further relates to articles that incorporate the vibration dampers as well as a method of vibration damping.

2. Description of the Related Art

Vibration dampers are well known. Vibration dampers typically include a viscoelastic material that is applied to an article that experiences resonant vibrations. The viscoelastic material absorbs and dissipates the vibrational energy, thereby damping the vibrations and reducing any associated noise. Sometimes the viscoelastic material is applied to the article alone. Such structures are often referred to as "free layer" dampers. However, improved damping can be obtained when the viscoelastic material is sandwiched between the article and a relatively stiff constraining layer. Such structures are often referred to as "constrained layer" dampers.

Other constructions that offer improved damping are often referred to as "damped laminates." Damped laminates are frequently used to replace sheet metal panels (e.g., sheet metal automobile body panels). The damped laminate typically contains a viscoelastic material sandwiched between two sheet metal skins. The damped laminate functions as an inherently damped structural member because the sheet metal skins are analogous to constraining layers.

A stiff viscoelastic vibration damping material could offer particular advantages in damped laminates. Damped laminates are conventionally manufactured by stamping, deep drawing or bending a large, flat sandwich construction comprising the viscoelastic material between the two sheet metal skins or constraining layers. These operations convert the flat, planar sandwich construction into a "three-dimensional" article. However, these operations also exert considerable stress on the flat sandwich construction. Sometimes these stresses are relieved by slight, involuntary shifting of the adjacent constraining layers skins relative to each other, but such movement is undesirable. A stiff viscoelastic material would better resist this movement.

The stiffness of a panel is directly proportional to the cube of the panel's thickness. Thus, replacing a single sheet metal panel with a damped laminate that incorporates two sheet metal skins, each having one-half the thickness of the original panel, yields a damped laminate that could have one-fourth the stiffness of the original panel. This reduction in stiffness may be undesirable. Incorporating a stiff viscoelastic material between the two sheet metal skins would increase the stiffness of the damped laminate.

Thus, there is considerable need for stiff vibration damping materials. Stiff vibration damping materials would be useful in damped laminates that are subsequently processed by stamping, deep drawing, or bending if the adjacent sheet metal skins were less likely to shift relative to each other. Stiff vibration damping materials could also improve the stiffness of the damped laminates. Preferably, however, any increase in stiffness will not cause a loss of damping performance. The increase in stiffness should desirably be accompanied by at least equivalent damping performance and, ideally, increased damping performance. However, a stiff viscoelastic vibration damping material can reduce vibration damping performance. It would also be advantageous if the temperature range over which good damping performance was provided could be expanded. Stiff vibration damping materials would also be useful in free layer and constrained layer dampers if they caused an overall increase in damping performance.

SUMMARY OF THE INVENTION

In one aspect, this invention relates to a method for vibrationally damping an article that is subject to resonant vibrations. The method comprises the steps of providing a vibration damper and applying the vibration damper to the article to damp the resonant vibrations. In one embodiment, the vibration damper comprises an acrylate viscoelastic vibration damping material that includes an effective amount of a hydrophobic silica.

The acrylate viscoelastic vibration damping material may be an acrylic acid ester homopolymer. Preferably, the acrylic acid ester homopolymer is derived from a nontertiary alkyl alcohol having 1 to 14 carbon atoms. Desirably, at least a major proportion of the alcohol molecules have a carbon-to-carbon chain length of 4 to 12 carbon atoms that terminates at the hydroxyl oxygen atom. Further, it is preferred that the chain contain at least about one-half the total number of carbon atoms in the alcohol molecule.

More preferably, however, the acrylate viscoelastic vibration damping material is a copolymer of an acrylic acid ester and at least one monomer that has a polar group and which is copolymerizable with the acrylic acid ester. The acrylic acid ester may be derived from the same nontertiary alkyl alcohols used to provide the acrylic acid ester homopolymer. The polar group for the copolymerizable monomer is preferably a carboxyl moiety. Particularly preferred copolymers are based on isooctylacrylate and acrylic acid or isooctylacrylate and isobornylacrylate.

In general, the acrylic acid ester provides, by weight, a major proportion of the copolymer, while the copolymerizable monomer provides, by weight, a minor proportion. However, it is preferred that the acrylic acid ester provide about 60 to 98 wt. % of the copolymer (more preferably, about 80 to 98 wt. %) while the copolymerizable monomer correspondingly provides about 40 to 2 wt. % (more preferably about 20 to 2 wt. %), based on the combined weight of two components.

The hydrophobic silica advantageously increases the stiffness (modulus) of the viscoelastic vibration damping material. As explained more fully below, stiffness can be assessed by measuring the overlap shear strength of the viscoelastic material. Preferably, the hydrophobic silica has a B.E.T. surface area of at least 10 $m^2/g$, more preferably a B.E.T. surface area of about 50 to 400 $m^2/g$. The viscoelastic vibration damping material typically includes at least about 2 wt. % of the hydrophobic silica (based on the weight of acrylic acid ester homopolymer or copolymer). More preferred viscoelastic vibration damping materials contain about 2 to 15 wt. % of the hydrophobic silica. Even more preferred vibration damping materials contain about 2 to 10 wt. % of the hydrophobic silica. The most preferred contain about 2 to 5 wt. % of the hydrophobic silica.

The viscoelastic vibration damping material may be used directly and alone in conjunction with an article that is subject to resonant vibrations so as to provide a free layer damper. Preferably, however, the viscoelastic vibration damping material is used with a relatively stiff constraining layer. Various materials may be used to provide the constraining layer; metals and polymers are preferred.

The viscoelastic vibration damping material may also be used to provide a damped laminate comprising the viscoelastic material between two constraining layers so as to yield an inherently damped structural member. Each constraining layer may have a thickness greater than about 125 microns (μm), (more preferably about 125 to 380 μm) with the thicknesses of each constraining layer being substantially equal in the most preferred embodiments. Damped laminates having more than three (e.g., five) alternating viscoelastic material layers and constraining layers are also possible.

Incorporating the hydrophobic silica into the viscoelastic vibration damping material increases the stiffness of the viscoelastic material as well as the stiffness of vibration dampers made therewith. Advantageously, however, the enhanced stiffness does not cause a significant loss of damping performance. At elevated temperatures, even increased damping performance has been observed. The addition of hydrophobic silica also results in vibration dampers that provide damping over a broad temperature range.

A wide variety of useful articles may incorporate vibration dampers according to the invention. These articles include motor vehicle body panels, sheet metal panels used in the white goods industry, and metallized siding for residential and commercial construction.

BRIEF DESCRIPTION OF THE DRAWINGS

The invention will be more fully understood with reference to the following drawings in which similar reference numerals designate like or analogous components and in which:

FIG. 4 is a graphical representation of loss factor vs. temperature in °C. for example 2 and comparative example 2; and FIG. 5 is a graphical representation of loss factor vs. temperature in °C. for example 9 and comparative example 4.

DETAILED DESCRIPTION OF THE PREFERRED EMBODIMENTS

In one aspect, this invention relates to vibration dampers that incorporate a viscoelastic vibration damping material having improved stiffness. The viscoelastic vibration damping material is sometimes referred to herein as the viscoelastic material. By "viscoelastic" is meant a material that exhibits both viscous and elastic behavior. That is, a material that is capable of both dissipating and storing energy.

The vibration dampers of the invention can be applied to articles subject to resonant vibrations. The vibration dampers can be applied as free layer dampers or constrained layer dampers. Also, damped laminate vibration dampers can be prepared to provide inherently damped structural members. In all of these constructions, the viscoelastic material absorbs and dissipates the vibrational energy, thereby damping the resonant vibrations. Associated vibrational noise may also be reduced.

Figure 1:
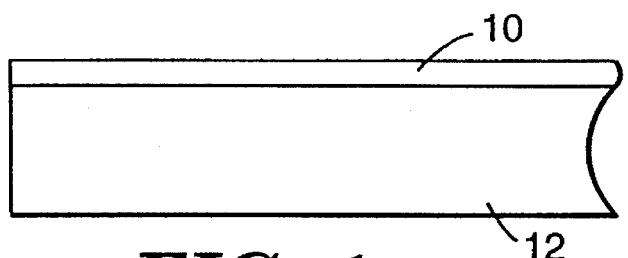
FIG. 1 is an enlarged elevational view of an article subject to resonant vibrations and having secured thereto a free layer vibration damper according to the invention.
Figure 2:
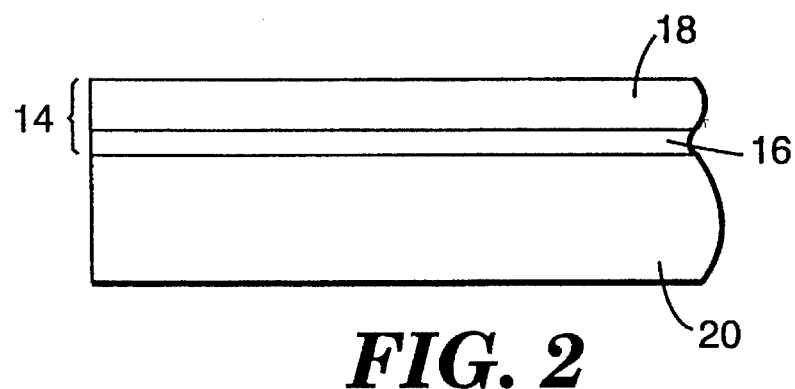
FIG. 2 is an enlarged elevational view of an article subject to resonant vibrations and having secured thereto a constrained layer vibration damper according to the invention.

Referring now to FIG. 1, the illustrated vibration damper comprises, and more preferably consists essentially of, a layer of viscoelastic vibration damping material 10 secured to an article 12 that is subject to resonant vibrations. Thus, FIG. 1 illustrates a free layer vibration damper. However, damping performance may be improved through the use of a constrained layer vibration damper. In FIG. 2, a constrained layer vibration damper 14 comprises, and more preferably consists essentially of, a layer of viscoelastic vibration damping material 16 and a relatively stiff constraining layer 18 that, for enhanced performance, is in direct, intimate contact with the layer of viscoelastic material. Constrained layer vibration damper 14 is secured to an article 20 that is subject to resonant vibrations. Vibration damper 14 may include additional viscoelastic material layers and constraining layers arranged in alternating fashion.

Figure 3:
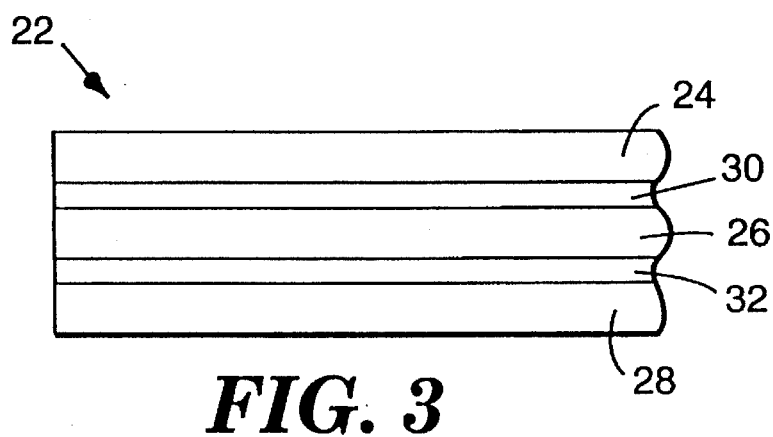
FIG. 3 is an enlarged elevational view of a damped laminate according to the invention.

Damping performance may also be improved through the use of a damped laminate vibration damper such as illustrated in FIG. 3. Damped laminate vibration damper 22 comprises, and more preferably consists essentially of, constraining layers 24, 26 and 28 that alternate with viscoelastic vibration damping material layers 30 and 32. Although FIG. 3 describes damped laminate 22 as having five layers, more than five layers arranged in alternating fashion could be used. However, three layer damped laminates are the most preferred. Such constructions would comprise constraining layers 24 and 26 with viscoelastic material layer 30 therebetween.

Constraining layers 24, 26 and 28 may be the same or may be different. They may have equal thicknesses or not. Preferably, however, each constraining layer is formed of the same material and to a substantially equal thickness (given inherent variations in thickness that naturally occur during manufacture). Viscoelastic material layers 30 and 32 may be the same or may be different. They may have equal thicknesses or not. Preferably, however, each viscoelastic material layer is formed of the same material and to a substantially equal thickness (given inherent variations in thickness that naturally occur during manufacture). For enhanced performance, adjacent viscoelastic material layers and constraining layers should be in direct, intimate contact.

Among the many useful articles into which the vibration dampers of the invention (especially the constrained layer dampers and the damped laminates) may be incorporated are motor vehicle body panels; motor vehicle engine covers, oil pans and valve covers; sheet metal panels used in the white goods industry (e.g., household appliances such as refrigerators, washing machines, dishwashers and the like); and metallized siding for residential and commercial construction.

The viscoelastic vibration damping material has improved stiffness. Importantly however, the improved stiffness is provided without a significant loss in vibration damping performance, and, in many instances, with improved vibration damping performance. The viscoelastic vibration damping material also damps effectively over a broad temperature range.

The viscoelastic vibration damping material is most effectively employed in the manufacture of damped laminates. The improved stiffness enables the damped laminates to be readily processed by stamping, deep drawing and bending, with reduced likelihood that adjacent constraining layers will shift with respect to each other. The viscoelastic vibration damping material also improves the flexural stiffness of the damped laminate.

The preferred viscoelastic vibration damping materials are acrylate-based. The acrylate-based viscoelastic material may be an acrylic acid ester homopolymer, in which event the acrylic acid ester is preferably derived from a nontertiary alkyl alcohol. The nontertiary alkyl alcohol typically has from 1 to 14 carbon atoms with at least a major proportion of the molecules having a carbon-to-carbon chain length of 4 to 12 carbon atoms, which chain terminates at the hydroxyl oxygen atom. The chain furthermore preferably contains at least about one-half the total number of carbon atoms in the molecule.

More preferably, however, the acrylate-based viscoelastic material comprises, and even more preferably consists essentially of, a copolymer of: (a) an acrylic acid ester, and (b) at least one monomer that has a polar group and which is copolymerizable with the acrylic acid ester. The acrylic acid ester may be derived from the same nontertiary alkyl alcohols used to prepare the acrylic acid ester homopolymer. Acrylic acid esters that are preferred for providing the homopolymer are also preferred for providing the copolymer.

Preferably, the polar group of the copolymerizable monomer is a carboxylic acid moiety. Suitable copolymerizable monomers include acrylic acid, methacrylic acid and itaconic acid, as well as maleic anhydride, acrylamide and isobornylacrylate. Other copolymerizable monomers may be used to provide viscoelastic vibration damping materials useful in the invention. Such other monomers include alkyl vinyl ethers, vinylidene chloride, styrene and vinyltoluene, but only when these are used in amounts small enough to not measurably detract from the shear strength or vibration damping properties of the viscoelastic material.

The copolymerizable monomer broadly provides about 0% to 50% by weight of the viscoelastic material, based on the combined weight of the acrylic acid ester and the copolymerizable monomer. More preferably, the copolymerizable monomer provides about 0% to 30% by weight. In general, the copolymerizable monomer provides, by weight, a minor proportion of the copolymer while the acrylic acid ester provides, by weight, a major proportion of the copolymer. As the amount of the copolymerizable monomer increases, both the stiffness (as measured by overlap shear strength at room temperature) and the temperature at which peak damping performance occurs tends to increase. Thus, the amount of the copolymerizable monomer will be determined in part by the stiffness that is desired as well as the temperature range over which damping needs to be provided. Also, smaller amounts of the copolymerizable monomer (about 3% to 12% by weight) tend to promote pressure sensitive adhesive properties in the damping material.

The stiffness of the viscoelastic vibration damping material is advantageously increased by the addition of hydrophobic silica. As explained more fully hereinbelow, stiffness and modulus are often used synonymously since these parameters are proportionally related. Preferably, the hydrophobic silica has a B.E.T. surface area of at least 10 $m^2/g$, more preferably a B.E.T. surface area of about 50 to 400 $m^2/g$. In general, the viscoelastic vibration damping material includes an effective amount of hydrophobic silica. An "effective amount" is an amount sufficient to provide a reasonably useful vibration damper that includes a viscoelastic material having better vibration damping properties and greater stiffness (modulus) when compared to the same viscoelastic material that does not include hydrophobic silica. More specifically, the silica should comprise at least about 2 parts by weight per 100 parts combined weight of the acrylic acid ester and the copolymerizable monomer (i.e., at least about 2 wt. %). More preferably, the hydrophobic silica provides about 2 to 15 parts by weight. Even more preferably it provides about 2 to 10 parts by weight. Most preferably, it provides about 2 to 5 parts by weight. At less than about 2 parts by weight hydrophobic silica and at more than about 15 to 20 parts by weight hydrophobic silica, the shear strength of the viscoelastic vibration damping material tends to drop off.

In some instances, the shear strength of the viscoelastic vibration damping material may be further and advantageously increased by crosslinking, although this may result in some loss of vibration damping properties. Whether a crosslinking agent is ultimately desirable will be determined in substantial part by the intended use of the vibration damper. Bisamides are preferred crosslinking agents, one example being N,N'-bis- 1,2-propyleneisophthalamide. Various other additives may also be usefully incorporated into the viscoelastic vibration damping material such as antioxidants, antistatic agents, fibers, fillers and pigments.

The viscoelastic vibration damping materials described herein may be used alone to provide a free layer damper. Preferably, however, they are used in conjunction with one or more constraining layers to provide a constrained layer damper. Preferred constraining layers have a stiffness which approximates that of the vibrating structure but are relatively stiffer than (i.e., have a higher modulus than) the viscoelastic vibration damping material. The stiffness of the constraining layer may be adjusted by varying its thickness. Thicknesses of about 25 microns (μm) to 1.5 mm are useful. The actual thickness will depend on the intended application.

Most preferably, however, the viscoelastic vibration damping materials described herein are employed in the manufacture of three layer damped laminates that provide inherently damped structural members for replacing sheet metal panels. Preferred constraining layers are stiffer than (i.e., have a higher modulus than) the viscoelastic vibration damping material. The thickness of the constraining layer skins varies depending on the intended application but individual constraining layers of greater than 125 μm, more preferably about 125 μm to 380 μm are quite useful. For example, in motor vehicle body panels, valve covers and oil pans, individual constraining layers of about 300 μm to 350 μm are useful while for other automotive components constraining layer thicknesses of about 125 μm are more desirable. In the manufacture of white goods industry household appliances, individual constraining layer thicknesses of about 200 μm to 250 μm are useful.

Suitable constraining layer materials include metals such as stainless steel, copper, aluminum, iron, nickel, chromium, titanium, cobalt, and alloys thereof. Stiff polymeric materials may also be used such as polyvinyl chloride, polyurethane, polycarbonate, polyepoxide, and fiber-reinforced plastics such as glass fiber, ceramic fiber, polymeric fiber, and metal fiber-reinforced polyesters. Also useful are polyesters, epoxies, polyamides, vinyl esters and polysulfones. Other suitable constraining layers can be provided by glass or ceramics.

The viscoelastic vibration damping material may be readily produced by solution polymerization. The acrylic acid ester monomer and the copolymerizable monomer (if any is included) are blended in the desired ratio and then diluted to a concentration of about 20% to 40% monomers by the addition of a moderately polar solvent such as ethyl acetate, methyethyl ketone or acetone. A thermally activated polymerization initiator such as benzoyl peroxide or azo-bis-isobutyronitrile is added in an amount of about 0.25% by weight based on the weight of the monomers. The desired amount of hydrophobic silica may then be added followed by thorough mixing to disperse the silica in the polymerizable solution.

The polymerizable solution is then transferred to an appropriate reaction vessel, purged with nitrogen, sealed, and maintained at a temperature of about 55° to 60° C. for about 24 hours until the polymerization is complete. The resulting solution polymer may then be further diluted to about a 25% solids content, using additional moderately polar solvents of the type described above.

The solution polymer may be applied to the surface of a substrate at room temperature by roll coating, reverse roll coating, die coating, knife coating or the like to an appropriate wet thickness, typically about 50 to 100 μm. The solvent may then be removed by heating and drying the coated substrate in an oven (for example, about 1 minute at about 230° C.) to yield a viscoelastic vibration damping material layer having a typical thickness of about 10 to 25 μm. The actual thickness desired may depend on the application and can be selected accordingly.

The substrate to which the viscoelastic vibration damping material is applied may be the article that is subject to resonant vibrations so as to provide a free layer damper as shown in FIG. 1. Alternatively, the substrate may be the constraining layer in a constrained layer damper. The substrate could also be one of the constraining layers in a damped laminate. The viscoelastic vibration damping material-coated substrate may be laminated to a second substrate so as to form a sandwich construction comprising the viscoelastic material between the two substrates. The second substrate could be the article that is subject to resonant vibrations so as to provide a constrained layer damper as shown in FIG. 2, or it could be another constraining layer in a damped laminate. In a damped laminate the different constraining layers usually have a substantially equal thickness. The article to which a constrained layer vibration damper is secured may well have a thickness that is considerably greater than the thickness of the constraining layer.

The damped laminate may be assembled by passing the sandwich construction between a pair of nip rollers heated to about 90° to 120° C., the actual temperature depending on the particular substrates and viscoelastic material. Damped laminates having more than three layers can be prepared by the successive addition of viscoelastic vibration damping material layers and constraining layers in the manner described above or by the lamination of one or more preformed viscoelastic vibration damping material-coated substrates.

The invention will be more fully understood with reference to the following nonlimiting examples in which all parts refer to parts by weight unless noted otherwise.

EXAMPLE 1 AND COMPARATIVE EXAMPLE 1

An initial mixture comprising 235.2 grams (g) of isooctyl acrylate, 4.8 g of acrylic acid, and 360.0 g of ethyl acetate was blended together. A 300.0 g portion of this mixture was poured into each of two 16 oz. amber bottles. 0.30 g of an azo-bis-isobutyronitrile thermally activated initiator (VAZO 64, E.I. dupont de Nemours) was added to each bottle. 6.00 g of AEROSIL R-972 hydrophobic silica (Degussa Corp.) was added to one of the bottles. This provided example 1. No silica was added to the other bottle. This provided comparative example (C.E.) 1. The bottles were bubbled with nitrogen for 10 minutes, sealed, and placed in a water bath at 60° C. for 24 hours to polymerize. After polymerization, a sufficient volume of ethyl acetate was added to each bottle to yield a solution that had a 25% solids content.

EXAMPLE 2 AND COMPARATIVE EXAMPLE 2

These examples were prepared as described in conjunction with example 1 except using 225.6 g of isooctyl acrylate, 14.4 g of acrylic acid, and 360.0 g of ethyl acetate in the initial mixture. Example 2 further contained 6.00 g of AEROSIL R-972 hydrophobic silica. Comparative example 2 did not contain hydrophobic silica.

EXAMPLES 3 TO 8 AND COMPARATIVE EXAMPLE 3

These examples were prepared as described in conjunction with example 1 except using 216.0 g isooctylacrylate, 24.0 g acrylic acid, and 360.0 g ethyl acetate in the initial mixture. 1.20 g AEROSIL R-972 hydrophobic silica were added to example 3, 2.40 g were added to example 4, 6.00 g were added to example 5, 12.00 g were added to example 6, 18.00 g were added to example 7, and 24.00 g were added to example 8. Comparative example 3 did not contain hydrophobic silica.

EXAMPLE 9 AND COMPARATIVE EXAMPLE 4

These examples were prepared as described in conjunction with example 1 except using 121.5 g of isooctyl acrylate, 28.5 g of acrylic acid, and 450.0 g of ethyl acetate in the initial mixture. 0.19 g of VAZO 64 polymerization initiator was also added to each amber bottle. Example 9 contained 3.75 g AEROSIL R-972 hydrophobic silica. Comparative example 4 did not contain hydrophobic silica.

EXAMPLE 10 AND COMPARATIVE EXAMPLE 5

These examples were prepared as described in conjunction with example 1 except using 160.8 g of isooctyl acrylate, 79.2 g of isobornyl acrylate, and 360.0 g of ethyl acetate in the initial mixture. Example 10 contained 6.00 g of AEROSIL R-972 hydrophobic silica. Comparative example 5 did not contain hydrophobic silica.

The foregoing examples and comparative examples were then evaluated for their stiffness and vibration damping properties following the procedures described below. The results are reported in Tables 1 and 2 and are shown in FIGS. 4 and 5.

SAMPLE PREPARATION AND TEST PROCEDURES

Sample Preparation

Damped laminates were made using the viscoelastic vibration damping materials of the various examples and comparative examples. More specifically, a solution polymer was coated onto a 0.0125 inch (0.3175 mm) thick cold rolled steel panel which had been cut to be nominally 6 inches (150 mm) by 4 inches (100 mm) in dimension. A number 75 coating rod from R D Specialties was used to spread the solution to a wet thickness of approximately 0.1 mm. The coated panel was placed in a 400° F. (204° C.) oven along with an uncoated panel of the same material. After one minute, the two panels were removed from the oven. A damped laminate comprising the viscoelastic vibration damping material sandwiched between the two steel panels was prepared. The sandwich construction was passed between a pair of steel rollers, each having a 3 mm thick, Shore A 80 rubber jacket, at a speed of about 12.5 cm/second. The rollers were not heated and were set to just touch each other when nothing was between them. After 24 hours at room temperature, samples were cut from the damped laminate for testing.

Overlap Shear Strength

The stiffness (modulus) of a vibration damper can be evaluated by measuring the overlap shear strength of the viscoelastic material because modulus is a property that influences overlap shear strength.

Overlap shear strength was measured by modifying a damped laminate sample. More specifically, a damped laminate sample nominally measuring 1 inch (25 mm) by 6 inches (150 mm) was modified to remove a portion of the upper steel panel and a portion of the lower steel panel. The resulting modified panel included a centrally positioned 1 inch (25 mm) by 1 inch (25 mm) overlap area comprising the two steel panels with the viscoelastic material therebetween. These samples were tested for overlap shear strength at room temperature using an Instron tensile testing machine at a jaw separation rate of 0.05 inch/minute (0.13 cm/minute). The maximum force in dynes/cm$^2$ that was observed before the damped laminate failed was recorded as the shear strength. The data are reported in Table 1 and each shear strength value is an average of three samples. If the viscoelastic vibration damping material exhibits a peak damping temperature that is greater than room temperature, then the overlap shear strength should be evaluated at a higher temperature. It should be measured at a temperature greater than the peak damping temperature.

TABLE 1

| Ex. | Wt. % IOA[1] | Wt. % AA[1] | Wt. % Silica[2] | Shear Strength (dynes/cm$^2$ × 10$^6$) |
|---|---|---|---|---|
| C.E.1 | 98 | 2 | 0 | 9.6 |
| 1 | 98 | 2 | 5 | 19.8 |
| C.E.2 | 94 | 6 | 0 | 15.0 |
| 2 | 94 | 6 | 5 | 32.9 |
| C.E.3 | 90 | 10 | 0 | 29.3 |
| 3 | 90 | 10 | 1 | 34.1 |
| 4 | 90 | 10 | 2 | 50.5 |
| 5 | 90 | 10 | 5 | 63.6 |
| 6 | 90 | 10 | 10 | 45.2 |
| 7 | 90 | 10 | 15 | 46.5 |
| 8 | 90 | 10 | 20 | 42.3 |
| C.E.4 | 81 | 19 | 0 | 75.8 |
| 9 | 81 | 19 | 5 | 75.2 |

[1] IOA = isooctyl acrylate. AA = acrylic acid. Wt. % values are based on the sum of IOA + AA.
[2] Wt. % is based on the combined weight of IOA + AA. 5 wt. % = 5 parts silica in 100 parts IOA + AA.

For comparative example 5, the shear strength was 8.0× 10$^6$ dynes/cm$^2$ while for example 10 it was 9.1×10$^6$ dynes/cm$^2$.

These data show that vibration dampers that incorporate a viscoelastic vibration damping material that includes hydrophobic silica have enhanced stiffness (as measured by overlap shear strength) when compared to vibration dampers that do not use a viscoelastic material that includes hydrophobic silica. Example 9 displayed a shear strength which approximates that of comparative example 4. However, these examples were tested at room temperature, a temperature below which peak damping occurred as shown by FIG. 5. When retested at 55° C., a temperature above the peak damping temperature, example 9 displayed greater shear strength (13.5×10$^6$ dynes/cm$^2$) than comparative example 4 (12.0× 10$^6$ dynes/cm$^2$). Preferably, the hydrophobic silica comprises at least about 2 wt. % based on the combined weight of the acrylic acid ester monomer and the copolymerizable monomer, more preferably about 2 to 15 wt. %, even more preferably about 2 to 10 wt. %, and most preferably about 2 to 5 wt. %.

These examples also show the utility of vibration damping materials that comprise about 80 to 98 wt. % of an acrylic acid ester and, correspondingly, about 20 to 2 wt. % of a copolymerizable monomer, the sum of the two components equaling 100 wt. %.

Damping Performance

Damping performance was determined by using the 3 point bending geometry on a RHEOMETRICS RSA II rheometer. The damped laminate test specimen was nominally 2 inches (50 mm) long, 0.5 inch (13 mm) wide, and 0.026 inch (0.7 mm) thick. A temperature ramp at 5° C./minute was run over the temperature range of −50° to 100° C. The sample was forced to undergo a sinusoidal strain at a frequency of 1 hz while measurements of the phase angle and thus the loss factor were made every 30 seconds. Loss factor is a measure of damping performance. The loss factor was plotted logarithmically versus temperature for example 2 and comparative example 2 in FIG. 4. Similar data were plotted in FIG. 5 for example 9 and comparative example 4. Comparable results were observed for the other examples described herein.

Damping performance was not diminished as a result of adding silica and was advantageously enhanced at higher temperatures. Much to the contrary, crosslinking increases the shear strength of a polymeric material but often with a consequent loss of damping performances.

The improvement in damping performance that is attained when a silica-containing viscoelastic material is used in a vibration damper may also be evaluated by measuring the breadth of the temperature range over which the loss factor exceeds a threshold value. Thus, for comparative example 2, the loss factor exceeded a threshold value of 0.04 over a temperature range of about 58.4° C. (i.e., from −31.7 to 26.7° C.) while for example 2, the loss factor exceeded the same threshold over a broader temperature range of about 63.9° C. (i.e., from −29.9 to 34.0° C.). When the loss factor threshold was 0.03, the temperature range over which comparative example 2 damped in excess of this value was 66.3° C., which increased to 81.0° C. when example 2 was tested. Table 2 shows the temperature range over which each example and comparative example exceeded loss factor thresholds of 0.03 and 0.04.

TABLE 2

| | Temperature Range Over Which Damping Exceeded Loss Factor Threshold Value (°C.) | |
|---|---|---|
| Example | Loss Factor > 0.04 | Loss Factor > 0.03 |
| C.E.1 | 44.8 | 50.8 |
| 1 | 47.2 | 53.4 |
| C.E.2 | 58.4 | 66.3 |
| 2 | 63.9 | 81.0 |
| C.E.3 | 54.7 | 62.3 |
| 3 | 49.2 | 56.5 |
| 4 | 64.1 | 75.5 |
| 5 | 68.8 | 82.6 |
| 6 | 71.0 | 87.0 |

TABLE 2-continued

| | Temperature Range Over Which Damping Exceeded Loss Factor Threshold Value (°C.) | |
|---|---|---|
| Example | Loss Factor > 0.04 | Loss Factor > 0.03 |
| 7 | 61.1 | 80.0 |
| 8 | 84.5 | 107.0 |
| C.E.4 | 62.0 | 74.1 |
| 9 | 71.9 | 84.2 |
| C.E.5 | 39.4 | 44.3 |
| 10 | 46.9 | 56.7 |

These data show that viscoelastic vibration damping materials that include hydrophobic silica result in vibration dampers that provide damping over a broader temperature range than those dampers that do not include a silica-containing viscoelastic material. Comparative example 3 and examples 3 to 8 illustrate that larger amounts of hydrophobic silica further expand the range over which damping occurs.

The viscoelastic vibration damping materials described herein have improved stiffness and damp over a broad temperature range but without a significant loss of vibration damping performance and, in many instances, with improved damping performance.

Various modifications are possible within the scope of the foregoing specification and drawings without departing from the spirit of the invention which is defined in the accompanying claims.

The embodiments for which an exclusive property or privilege is claimed are defined as follows:

1. A damped laminate comprising:
   a) a first constraining layer that has a thickness greater than about 125 μm;
   b) a second constraining layer that has a thickness greater than about 125 μm; and
   c) between the first and second constraining layers, a first layer of an acrylate viscoelastic vibration damping material that includes an amount of a hydrophobic silica sufficient to increase the stiffness of the acrylate viscoelastic vibration damping material;
   wherein the first and second constraining layers are each stiffer than the acrylate viscoelastic vibration damping material that includes the silica.

2. A damped laminate according to claim 1 wherein the first and second constraining layers are metal or polymeric and are of substantially equal thickness.

3. A damped laminate according to claim 2 wherein the acrylate viscoelastic vibration damping material is selected from the group consisting of homopolymers of an acrylic acid ester, and copolymers of an acrylic acid ester and at least one monomer that has a polar group and which is copolymerizable with the acrylic acid ester; and further wherein the acrylate viscoelastic vibration damping material includes about 2 to 15 weight % of the hydrophobic silica, based on the weight of the homopolymer or the copolymer.

4. A damped laminate according to claim 3 wherein the hydrophobic silica comprises about 2 to 10 weight %, based on the weight of the homopolymer or the copolymer.

5. A damped laminate according to claim 1 wherein the acrylate viscoelastic vibration damping material comprises:
   a) an acrylic acid ester that is derived from a nontertiary alkyl alcohol having 1 to 14 carbon atoms, wherein at least a major proportion of the alcohol molecules have a carbon-to-carbon chain length of 4 to 12 carbon atoms that terminates at the hydroxyl oxygen atom, and further wherein the chain contains at least about one-half the total number of carbon atoms in the alcohol molecule; and
   b) at least one monomer that has a polar group and which is copolymerizable with the acrylic acid ester.

6. A damped laminate according to claim 5 wherein the acrylic acid ester is isooctylacrylate and the at least one monomer is selected from the group consisting of acrylic acid and isobornylacrylate.

7. A damped laminate according to claim 6 comprising (i) about 80 to 98 weight % isooctylacrylate and, (ii) about 20 to 2 weight % acrylic acid, wherein the sum of (i) plus (ii) equals 100 weight %.

8. A damped laminate according to claim 6 wherein the first and second constraining layers are metal, and further wherein each has a thickness of about 125 to 380 μm.

9. A damped laminate according to claim 8 wherein the thicknesses of the first and second constraining layers are substantially equal.

10. A damped laminate according to claim 6 further comprising:
    a) on the second constraining layer, a second layer of an acrylate viscoelastic vibration damping material that includes an amount of hydrophobic silica sufficient to increase the stiffness of the second layer of acrylate viscoelastic vibration damping material; and
    b) on the second layer of acrylate viscoelastic vibration damping material, a third constraining layer that is stiffer than the second layer of acrylate viscoelastic vibration damping material that includes the silica.

11. A motor vehicle that includes a damped laminate according to claim 1 as a body panel.

12. A white goods household appliance that includes a damped laminate according to claim 1.

13. A damped laminate comprising:
    a) a first metal constraining layer that has a thickness greater than about 125 gm;
    b) a second metal constraining layer that has a thickness substantially equal to the thickness of the first constraining layer; and
    c) between the first and second constraining layers, a layer of a viscoelastic vibration damping material that comprises (i) about 80 to 98 weight % isooctylacrylate, (ii) about 20 to 2 weight % acrylic acid, wherein the sum of (i) plus (ii) equals 100 weight %, and (iii) about 2 to 15 weight % of hydrophobic silica based on the weight of (i) plus (ii);
    wherein the first and second constraining layers are each stiffer than the layer of viscoelastic vibration damping material.

\* \* \* \* \*